United States Patent
Shu et al.

(10) Patent No.: US 6,833,541 B2
(45) Date of Patent: Dec. 21, 2004

(54) DUAL-PARAMETER OPTICAL WAVEGUIDE GRATING SENSING DEVICE AND SENSOR

(75) Inventors: Xuewen Shu, Birmingham (GB); Yu Liu, Birmingham (GB); Donghui Zhao, Birmingham (GB); Lin Zhang, Birmingham (GB); Ian Bennion, Birmingham (GB); Bashir Aliyu Labbo Gwandu, Birmingham (GB); Filip Floreani, Birmingham (GB)

(73) Assignee: Aston Photonic Technologies Ltd., Southampton (GB)

( * ) Notice: Subject to any disclaimer, the term of this patent is extended or adjusted under 35 U.S.C. 154(b) by 3 days.

(21) Appl. No.: 10/244,593

(22) Filed: Sep. 17, 2002

(65) Prior Publication Data

US 2003/0085344 A1 May 8, 2003

(51) Int. Cl.[7] .............................. G01J 5/16; G02B 1/295
(52) U.S. Cl. ............................ 250/227.14; 250/227.18; 250/227.23; 385/10; 385/37
(58) Field of Search ....................... 250/227.11, 227.14, 250/227.16, 227.18, 227.23, 237 R; 385/10, 37

(56) References Cited

U.S. PATENT DOCUMENTS 4,996,419 A * 2/1991 Morey

OTHER PUBLICATIONS

P.M.Cavaleiro et al, "Simultaneous Measurement of Strain and Temperature Using Bragg Gratings Written in Germanosilicate and Boron–Codoped Germanosilicate Fibers", IEEE Photonics Technology Letters, vol. 11, No. 12, Dec. 1999, pp. 1635–1637.*

Bai–Ou Guan et al, "Simultaneous Strain and Temperature Sensing Measurement Using a Single Fiber Bragg Grating", Electronics Letters, IEE Stevenage, GB, vol. 36, No. 12, Jun. 8, 2000, pp. 1018–1019.*

(List continued on next page.)

*Primary Examiner*—Stephone B. Allen

(57) ABSTRACT

In the present invention an optical waveguide grating sensing device for a dual-parameter optical waveguide grating sensor includes a first optical waveguide grating of a first resonant wavelength provided in a first section of an optical waveguide and a second optical waveguide grating of a second resonant wavelength provided in a second of an optical waveguide. The first and second gratings have different coefficients of rate of change of wavelength as a function of temperature and have substantially the same coefficient of rate of change of wavelength as a function of stain.

6 Claims, 8 Drawing Sheets

OTHER PUBLICATIONS

P.M. Cavaleiro et al, "Simultaneous Measurement of Strain and Temperature Using Bragg Gratings Written in Germanosilicate and Boron–Codoped Germanosilicate Fibers", IEEE Photonics Technology Letters, vol. 11, No. 12, Dec. 1999, pp. 1635–1637.

Bai–Ou Guan et al., "Simultaneous Strain and Temperature Measurement Using a Single Fiber Bragg Grating", Electronics Letters, IEE Stevenage, GB, vol. 36, No. 12, Jun. 8, 2000, pp. 1018–1019.

Minho Song et al., "Simultaneous Strain and Temperature Sensing Using Two Fiber Bragg Gratings Embedded in a Glass Tube", CLEO '97: Conference on Lasers and Electro–Optics. Baltimore, MD, May 18–23, 1997, CLEO: Conference on Lasers and Electro–Optics, New York, IEEE, US, May 18, 1997, pp. 392–392.

G.P. Brady et al., "Stimultaneous Measurement of Strain and Temperature Using the First—and Second—Order Diffraction Wavelengths of Bragg Gratings", IEE Proc.–Optoelectron, vol. 244, No. 3, Jun. 1997, pp. 156–161.

G.P. Brady et al., "Demultiplexing of Fibre Bragg Grating Temperature and Strain Sensors", 2319 Optics Communications 111 (1994) Sep. 15, No. 1/2, Amsterdam, NL.

M.G. Xu et al., Discrimination Between Strain and Termperature Effects Using Dual–Wavelength Fibre Graing Sensors, Electronics Letters $23^{rd}$ Jun. 1994, vol. 30, No. 13, pp. 1085–1087.

* cited by examiner

DUAL-PARAMETER OPTICAL WAVEGUIDE GRATING SENSING DEVICE AND SENSOR

CROSS-REFERENCE TO RELATED APPLICATIONS

This application claims the benefit of EP Application No. 1309335.9, filed Nov. 2, 2001, in the Europe Intellectual Property Office, the disclosure of which is incorporated herein by reference.

FIELD OF THE INVENTION

The invention relates to a dual-parameter optical waveguide grating sensing device and to a dual-parameter optical waveguide grating sensor including such a device.

BACKGROUND TO THE INVENTION

Fibre Bragg gratings are fabricated by exposing the core of a photosensitive optical fibre to a UV laser interference pattern, thereby inducing a permanent, periodically varying, change in its refractive index. The photosensitivity of an optical fibre may be increased by hydrogenating the fibre. In this specification hydrogenation of an optical fibre is understood to mean loading an optical fibre with hydrogen or an isotope of hydrogen, such as deuterium. A number of different FBG types have been distinguished, characterised by markedly different spectral and thermal behaviours, originating from the UV excitation of several distinct physical mechanisms.

During the typical fabrication process, the resonant wavelength of the grating increases with UV exposure duration, indicative of the induction of a positive change in refractive index. The resulting FBG has come to be referred to as a Type I grating, and is the type most commonly fabricated using either free-space holographic or phase mask exposure techniques. Type I gratings may be fabricated in hydrogenated or non-hydrogenated optical fibre.

For a Type I grating fabricated in non-hydrogenated fibre, further UV exposure causes the Type I grating growth to become saturated. As the UV exposure continues, the observed reflectivity of the grating decreases almost to zero before increasing again as formation of the so-called Type IIA grating commences. The resonant wavelength of the grating decreases during this stage of the exposure, indicating a negative induced refractive index change. When a Type I grating is fabricated in hydrogenated optical fibre, saturated growth and erasure of the Type I grating is followed by formation of a regenerated optical fibre grating, named a Type IA grating, as disclosed in our co-pending European application No. 01308804.2 field on 16 Oct. 2001.

Due to their wavelength division multiplexing capabilities, fibre Bragg gratings (FBGs) have been the subject of numerous investigations for optical sensing. However, the simultaneous sensitivity of the resonant wavelength of the FBG to temperature and strain has complicated independent measurement procedures for these two parameters. To overcome the problem of cross-sensitivity, several methods have been proposed and investigated including dual-wavelength superimposed gratings, utilisation of the first- and second-order diffraction from a single FBG, a hybrid FBG/long period grating (LPG), an FBG superimposed on a polarisation-rocking filter, and spliced FBGs inscribed in different fibres. All of these methods are, in effect, dual-grating methods and although they have achieved parameter discrimination, most of them are far from suitable for practical use due to either insufficiently large differentiation of the thermal and strain coefficients between the gratings, or over-complex signal interrogation and processing requirements. Additionally, in the case of the otherwise attractive FBG/LPG structures, the broad spectral response of the LPG imposes severe limitations on multiplexing.

SUMMARY OF THE INVENTION

According to a first aspect of the present invention, there is provided an optical waveguide grating sensing device for a dual-parameter optical waveguide grating sensor, the sensing device comprising:

a first optical waveguide grating of a first resonant wavelength provided in a first section of optical waveguide; and a second optical waveguide grating of a second resonant wavelength provided in a second section of optical waveguide, the first and second gratings having different coefficients of rate of change of wavelength as a function of temperature and having substantially the same coefficient of rate of change of wavelength as a function of strain.

The first and second sections of optical waveguide are preferably first and second sections of optical fibre. The first and second sections may be sections of a single optical fibre, and may be provided substantially adjacent one another. The optical fibre is preferably Boron-Germania co-doped optical fibre.

The first and second optical waveguide gratings are desirably fibre gratings, and may be fibre Bragg gratings. Preferably, the first fibre grating is a type I fibre grating or a type IIA fibre grating. The type I fibre grating may be a type I fibre grating fabricated in hydrogenated optical fibre or a type I fibre grating fabricated in non-hydrogenated optical fibre. The second fibre grating is preferably the other of a type I fibre grating fabricated in hydrogenated optical fibre or a type I fibre grating fabricated in non-hydrogenated optical fibre, or a type IA fibre grating.

According to a second aspect of the present invention, there is provided a dual-parameter optical waveguide grating sensor comprising:

an optical waveguide grating sensing device according to the first aspect of the invention; and interrogation means operable to determine the resonant wavelengths of the gratings and to measure any changes therein, the first and second gratings being arranged such that, in operation, both gratings are exposed to the same temperature and strain, whereby a change in the temperature and strain experienced by the gratings causes a change in the resonant wavelengths of the gratings, and measurement of the induced wavelength changes, together with the temperature and strain coefficients of the gratings, enabling the magnitude of the changes in temperature and strain to be determined simultaneously.

The dual-parameter optical waveguide grating sensor may comprise a plurality of optical waveguide grating sensing devices according to the first aspect of the invention, each device being located at a different sensing location such that each device may be used to simultaneously determine the temperature and strain at the respective location, thereby forming a quasi-distributed sensor.

Preferably, each grating within the sensor has a different resonant wavelength. The resonant wavelengths of the gratings within spectrally adjacent sensing devices are preferably selected such that, in operation, the spectral profiles of the gratings within a first sensing device do not substantially overlap with the spectral profiles of the gratings within an adjacent sensing device.

BRIEF DESCRIPTION OF THE DRAWINGS

An example of the present invention will now be described in detail with reference to the accompanying drawings, in which.

DETAILED DESCRIPTION OF THE PREFERRED EMBODIMENTS

Figure 1:
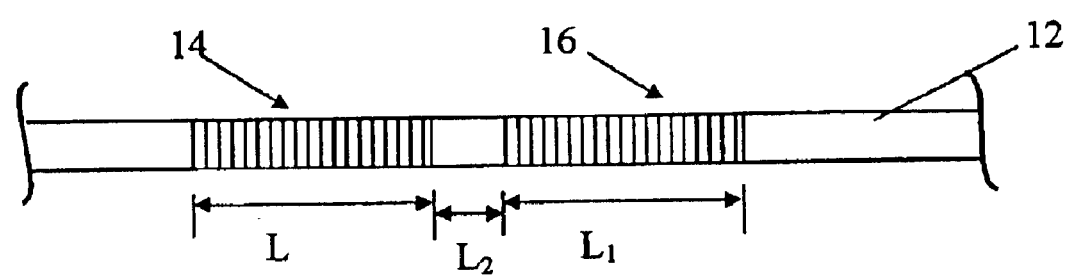
FIG. 1 is a diagrammatic representation of a dual-parameter optical waveguide grating sensing device according to the first aspect of the present invention.

Referring to FIG. 1, a dual-parameter optical waveguide grating sensing device for a dual-parameter optical waveguide grating sensor in this example takes the form of a fibre Bragg grating sensing device 10. The device 10 comprises an optical waveguide in the form of a length of Boron-Germania (B/Ge) optical fibre 12, a first fibre Bragg grating (FBG) 14 of a first resonant wavelength and a second FBG 16 of a second resonant wavelength. In this example, the first FBG 14 is a Type IA grating and the second FBG 16 is a Type IIA grating. Both gratings 14, 16 have a length ($L_1$) of 7 mm. The gratings 14, 16 are separated by 1 mm ($L_2$).

The device 10 was fabricated as follows. The B/Ge fibre 12 was first hydrogenated and then the Type IA FBG 14 was inscribed in the fibre 12 using the using the phase mask grating fabrication technique, employing a frequency-doubled argon laser having a wavelength of 244 nm. This fabrication technique is well known to persons skilled in the art and so it will not be described further here. The spectral profile of the grating 14 was measured in-situ during fabrication using an optical spectrum analyser (spectral resolution 0.1 nm), the grating 14 being illuminated with a broadband light emitting diode. The Type IA grating 14 has a resonant wavelength of 1554.29 nm and a spectral bandwidth of 0.21 nm. The fibre 12, including the Type IA FBG 14, was then annealed for 24 hours at 95° C. to stabilise the grating properties and to remove any residual hydrogen from the fibre 12. Following this, the Type IIA grating 16, having a resonant wavelength of 1554.51 nm and a spectral bandwidth of 0.25 nm, was similarly inscribed in the fibre 12. Finally, the fibre 12, including both gratings 14, 16, was annealed once more, for 48 hours at 120° C., to stabilise the final structure of the device 10.

During fabrication of the gratings 14, 16, quite different growth characteristics were observed for gratings inscribed in hydrogen-free fibre and hydrogenated fibre. As illustrated by the transmission (T) profiles shown in FIG. 2, for the Type IIA grating 16, fabricated in hydrogen-free fibre, a Type I grating was first formed, grew to a maximum strength as the UV exposure proceeded, and then became weaker to the point of complete erasure. During this stage of the fabrication procedure the resonant Bragg wavelength of the Type I grating continuously shifted to longer wavelengths. With further UV exposure, the Type IIA grating 16 was regenerated in the fibre, growing stronger with increasing UV exposure. During this stage of the fabrication process the resonant Bragg wavelength of the grating 16 continuously shifted to shorter wavelengths.

Figure 2:
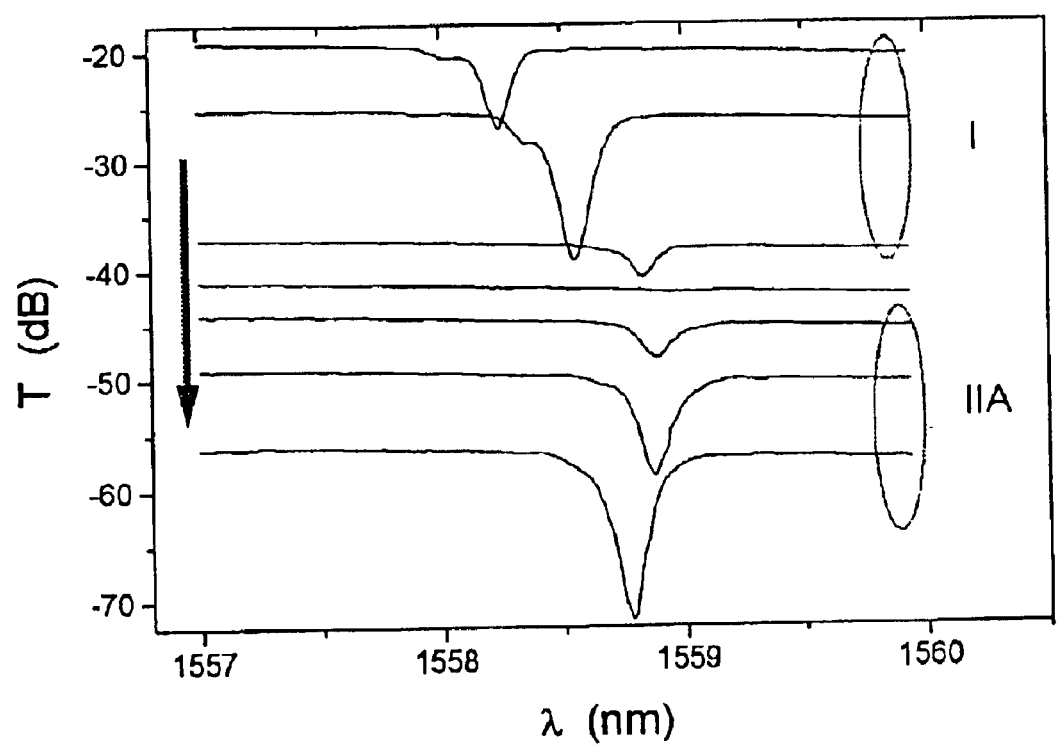
FIG. 2 shows the evolution of the transmission spectrum of a grating inscribed in hydrogen-free Boron-Germania co-doped optical fibre using a long UV exposure.
Figure 3:
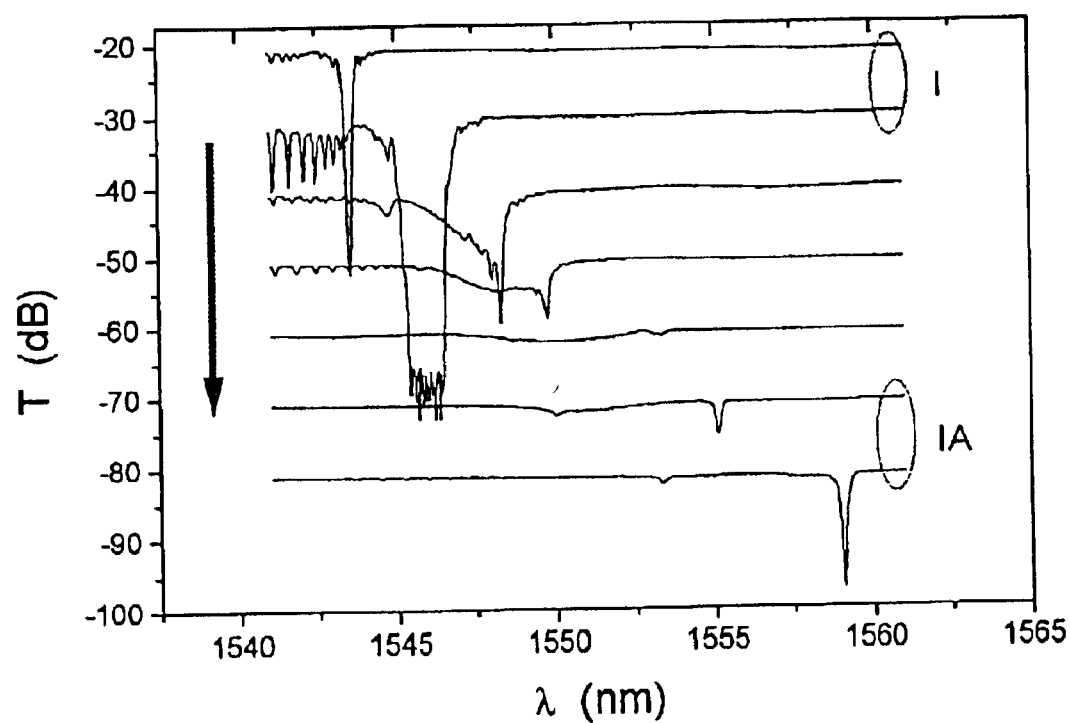
FIG. 3 shows the evolution of the transmission spectrum of a grating inscribed in hydrogenated Boron-Germania co-doped optical fibre using a long UV exposure.

However, during fabrication of the Type IA grating 14 in hydrogenated fibre, a quite different behaviour was observed following the formation and erasure of the initial Type I grating. As shown in FIG. 3, regeneration of the Type IA grating 14 occurred with increasing UV exposure. In this case however the resonant Bragg wavelength shifted continuously to longer wavelengths, in marked contrast with Type IIA grating growth. A 16 nm wavelength red-shift was recorded for a 2 hour UV exposure. Referring to FIGS. 2 and 3, the magnitude of the red-shift undergone by the resonant wavelength of the Type IA grating 14 is significantly larger than the resonant wavelength blue-shift which occurs during formation of the Type IIA grating 16.

The spectral profiles of each of the three types of grating were measured following a period of annealing at 95° C. In all cases, blue-shifts in the resonant wavelength were recorded, but the 3–5 nm blue-shifts undergone by Type IA gratings were far larger than the <1 nm wavelength blue-shifts undergone by the Type I and Type IIA gratings.

Figure 4:
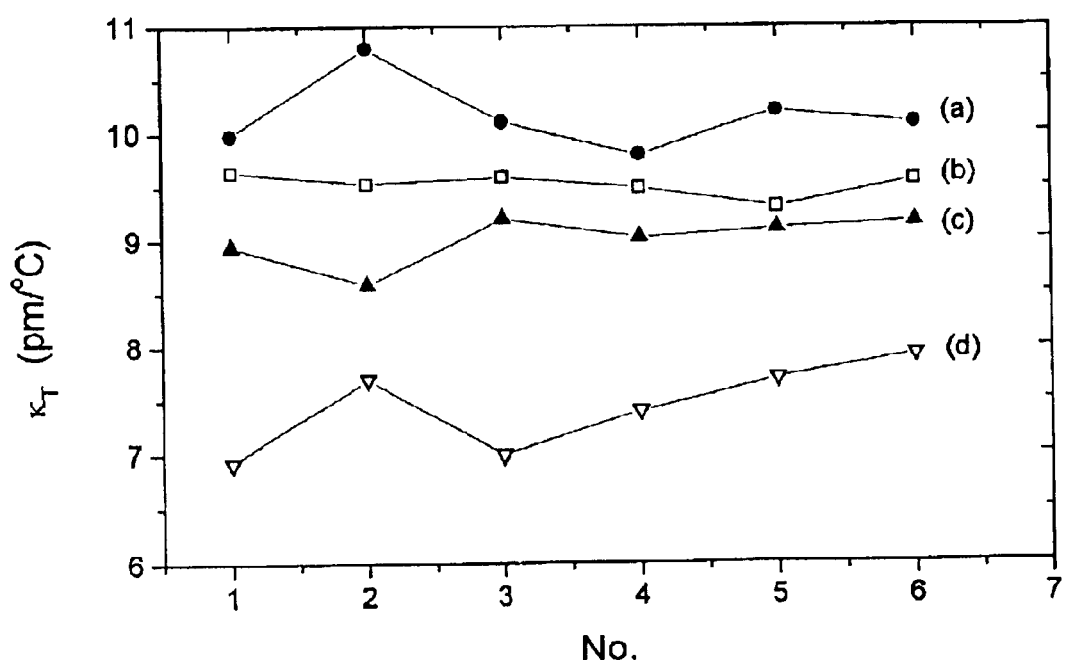
FIG. 4 shows the distribution of the temperature coefficient measured for different types of FBG inscribed in Boron-Germania co-doped optical fibre.

A comparative study of the temperature and strain coefficients of each grating type was carried out. 24 gratings were fabricated, as described above, 6 of each grating type. Two sets of Type I gratings were produced, one set being fabricated in hydrogen-free fibre and the other set being fabricated in hydrogenated fibre. The thermal response of each FBG was measured by heating it, using a thermoelectric cooler, from 0° C. to 80° C. in incremental steps of 10° C. The measured thermal coefficients ($\kappa_T$) are shown in FIG. 4 for all 24 gratings. Data set (a) are the measurements for the Type IIA gratings, data set (b) Type I (hydrogen-free fibre) gratings, data set (c) Type I (hydrogenated fibre), and data set (d) Type IA gratings. For Type I gratings, there is approximately a 6% difference in the average value of the thermal coefficient between the gratings fabricated in hydrogen-free fibre and those fabricated in hydrogenated fibre. Out of the four different types of gratings, the Type IIA gratings have the highest temperature coefficient, it being 10.80 pm/° C. The Type IA grating have the lowest temperature coefficient (6.93 pm/° C.). The 55% difference in the temperature coefficients of these two types of gratings is substantially larger than that present in all previously reported dual-grating sensors.

The strain response for each type of grating was also examined, by stretching the fibres containing the gratings between two translation stages and monitoring the induced shift in the resonant Bragg wavelength. It was found that the gratings all showed similar strain sensitivities, regardless of grating type.

Figure 5:
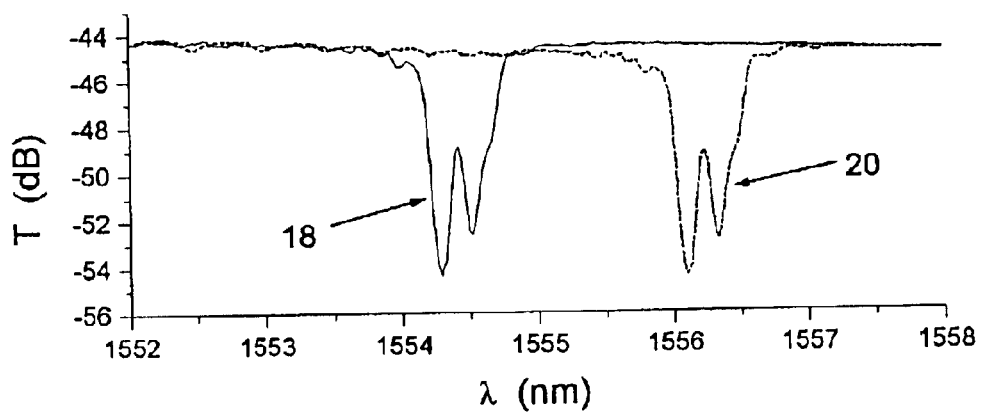
FIG. 5 illustrates how the spectral response of the gratings of the device of FIG. 1 changes as a function of strain.

FIG. 5 shows the transmission (T) spectrum of the dual-parameter fibre grating sensing device 10, at room temperature (21° C.), when the gratings 14, 16 are unstrained 18 and strained 20. The separation between the peak wavelengths of the gratings 14, 16 is 0.22 nm. When a strain of 1667 με was applied, the separation between the peak wavelengths of the gratings 14, 16 remained essentially unchanged.

Figure 6:
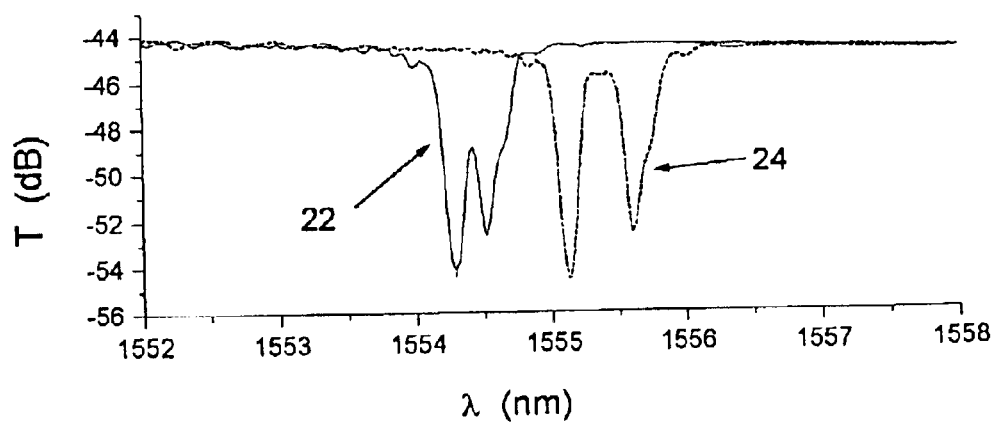
FIG. 6 illustrates how the spectral response of the gratings of the device of FIG. 1 changes as a function of temperature.

The linearity of the thermal response of the gratings 14, 16 was investigated by heating the sensing device 10 from 0° C. to 80° C. and measuring the shifts in the peak wavelengths of the gratings 14, 16. FIG. 6 shows the transmission (T) spectrum of the sensing device 10, under zero strain, when the gratings are at room temperature (21° C.) 22 and at a raised temperature (120° C.) 24. At the raised temperature of 120° C. it can be seen that the separation between the peak wavelengths of the gratings 14, 16 is significantly greater than at room temperature.

Figure 7:
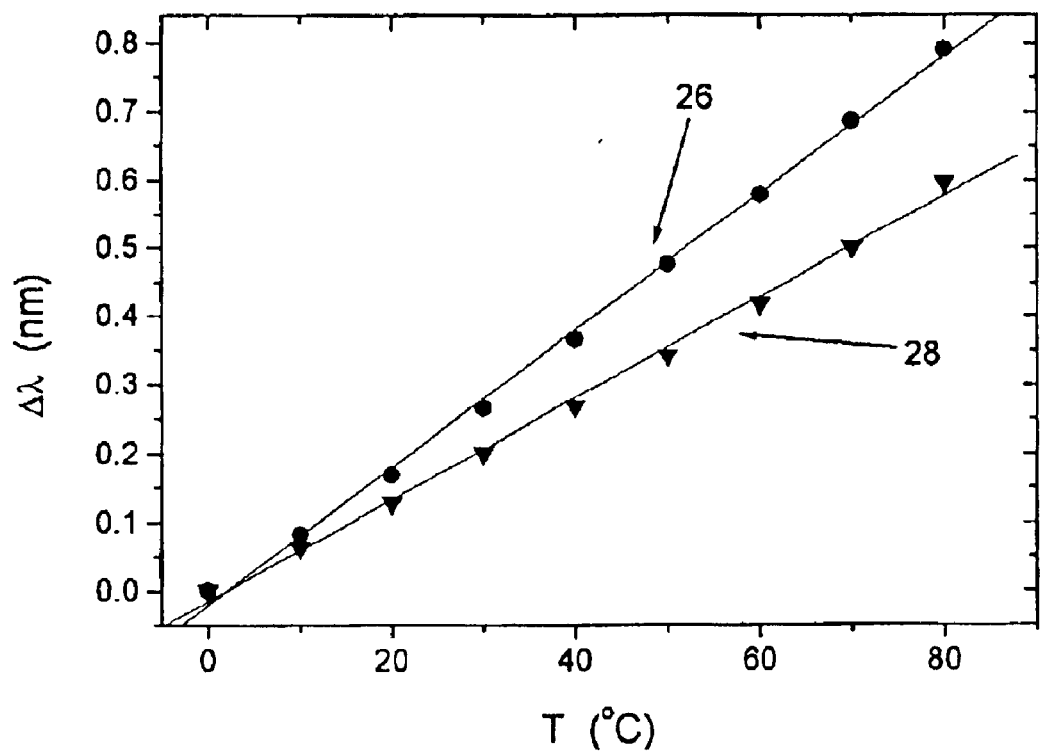
FIG. 7 shows the shift in the resonant wavelengths of the gratings of the device of FIG. 1 as a function of temperature.

The wavelength of each of the gratings 14, 16 at the applied temperatures is shown in FIG. 7, the recorded measurements for the Type IIA grating 16 are represented by circles 26 and the measurements for the Type IA grating 14 are represented by triangles 28. Best-fit straight lines were applied to the two sets of measurements. From these measurements it is clear that the thermal response of both grating types is linear. However, there is a substantial difference between the respective temperature coefficients of the two types of grating. The best-fit straight lines give temperature coefficients of 7.37 pm/° C. for the Type IA grating 14 and 10.02 pm/° C. for the Type IIA 16. The difference between the two temperature coefficients is some 36%.

Figure 8:
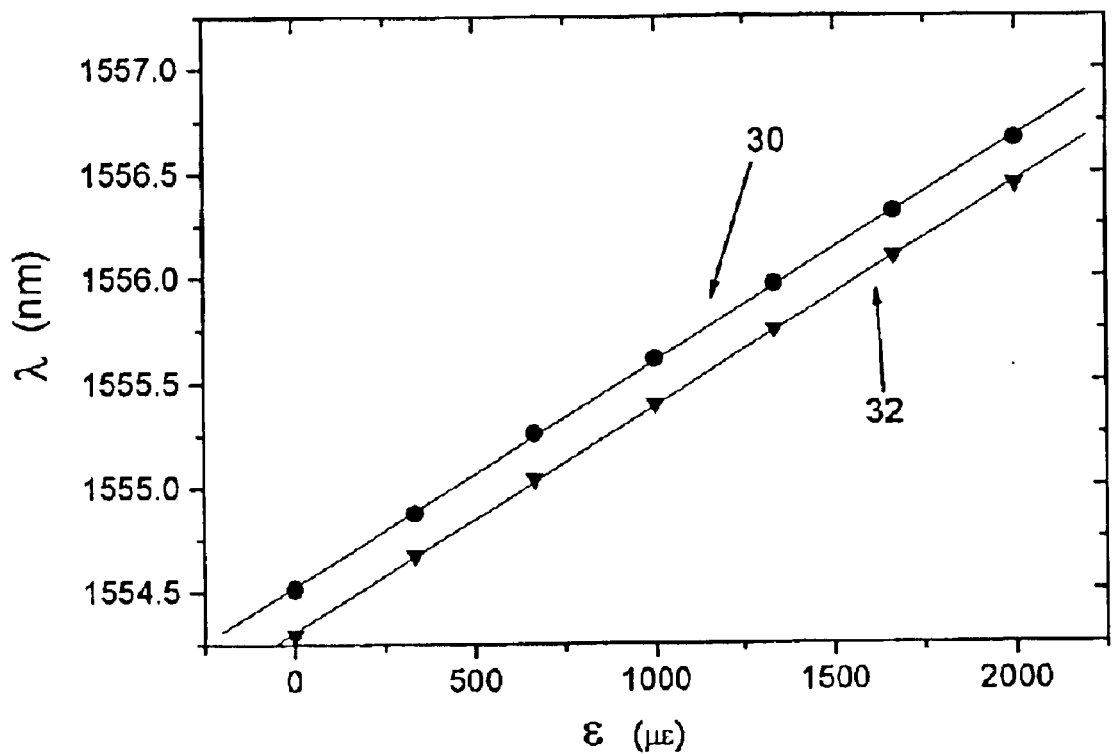
FIG. 8 shows the shift in the resonant wavelengths of the gratings of the device of FIG. 1 as a function of strain.

Following thermal evaluation, strain (ε) was applied to the sensing device 10, over the range 0–2000 με in steps of approximately 250 με. The resonant wavelengths of the gratings 14, 16 were recorded for each applied strain and are shown in FIG. 8; the recorded measurements for the Type IIA grating 16 are represented by circles 30 and the measurements for the Type IA grating 14 are represented by triangles 32. Best-fit straight lines were applied to the two sets of measurements. The best-fit straight lines give strain coefficients of 1.074 pm/με for the Type IA grating 14 and 1.075 pm/με for the Type IIA grating 16, a difference of less than 0.1%.

Figure 9:
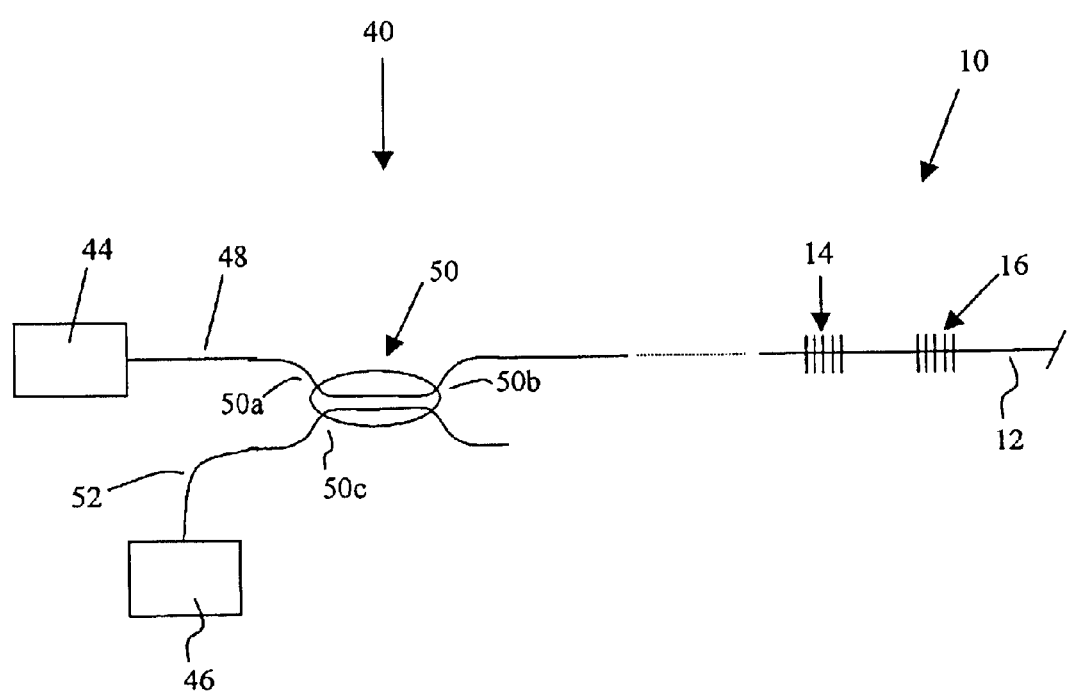
FIG. 9 is a schematic representation of a dual-parameter optical waveguide grating sensor according to the second aspect of the invention.

Referring to FIG. 9, a second aspect of the invention provides a dual-parameter optical fibre grating sensor 40. The sensor 40 comprises an optical fibre grating sensing device 10 according to the first aspect of the invention, and interrogation means 42 in the form of an optical source 44 and an optical spectrum analyser (OSA) 46. The interrogation means 42 is operable to determine the resonant wavelengths of the gratings 14, 16 within the sensing device 10 and to measure any changes in those wavelengths.

The optical source 44 in this example is a broadband light emitting diode (LED) and generates an optical signal having a spectral bandwidth which includes the wavelengths of the gratings 14, 16. It will be appreciated however that any suitable broadband optical source or, alternatively, a tuneable optical source such as a tuneable laser, may be used to illuminate the gratings 14, 16. The optical signal from the optical source 44 is launched into a second optical fibre 48 connected to a first port 50a of an optical signal routing means, which in this example takes the form of a fibre optical coupler 50. The coupler 50 routes the optical signal out through a second port 50b, which is connected to the optical fibre 12 of the sensing device 10. Part of the optical signal is reflected by the gratings 14, 16 and is transmitted back along the fibre 12 to the coupler 50, where it is routed to a third port 50c. The third coupler port 50c is connected to a third optical fibre 52 which transmits the reflected optical signal to the OSA 46. The OSA 46 determines the wavelengths of the reflected optical signals and displays the information to the user, from which any shifts in the wavelengths of the gratings 14, 16 may be measured. An OSA is a standard piece of equipment in this field and its operation will be well known to the skilled person, so no further detail will be included here.

The gratings 14, 16 of the sensing device 10 are arranged such that, in operation, both gratings 14, 16 are exposed to the same temperature and strain.

A change in the temperature and strain experienced by the gratings 14, 16 will lead to a change in the resonant wavelengths of the gratings 14, 16. Measurement of the induced shifts in the resonant wavelengths of the gratings 14, 16, together with the temperature and strain coefficients of the gratings, allows the magnitude of the change in temperature and the applied strain to be determined simultaneously, as follows.

Generally, for a dual-parameter fibre grating sensor comprising two gratings, a sensitivity matrix can be constructed to provide for decoupling the temperature and strain information sensed by the two gratings, as follows:

$$\begin{bmatrix} \Delta\lambda_1 \\ \Delta\lambda_2 \end{bmatrix} = \begin{bmatrix} \kappa_{T1} & \kappa_{\varepsilon 1} \\ \kappa_{T2} & \kappa_{\varepsilon 2} \end{bmatrix} \begin{bmatrix} \Delta T \\ \Delta\varepsilon \end{bmatrix} \quad (1)$$

where the matrix coefficients, $\kappa_{Ti}$, $\kappa_{\varepsilon i}$ (i=1, 2), are determined from independent measurements of the temperature and strain sensitivities of the gratings 14, 16 of the sensing device 10.

Significantly, because the strain coefficients of the Type IA grating 14 and the Type IIA grating 16 are virtually identical, the signal processing required for decoupling the temperature and strain information sensed by the two gratings 14, 16 in the sensing device 10 is significantly simplified. A well-conditioned sensitivity matrix can therefore be constructed for this sensing device 10, thereby facilitating its use in practical applications. The maximum temperature and strain errors for the sensor 40 are calculated to be ±0.54° C./pm and ±4.4 με/pm respectively. This represents a substantial improvement on previously reported dual-parameter fibre grating sensors.

Because gratings of the types described exhibit narrow spectral (Bragg) response features, and since gratings of different types can readily be produced in a single optical fibre, the sensor 40 can take full advantage of FBG wavelength multiplexing capabilities. In contrast with alternative known sensors, this sensor 40 may readily be extended to using wavelength multiplexed arrays of gratings in one or more fibres, to thereby form an effective, quasi-distributed sensor having low splicing losses and high mechanical strength. Such a sensor would offer significant performance advantages over other known fibre grating sensors, including the advantages of single optical source operation and a robustness which eludes most other fibre grating sensors.

The above described study has revealed that fibre Bragg gratings fabricated in Boron-Germania co-doped optical fibre exhibit a strong dependence of temperature sensitivity on the grating type, but very weak dependence of strain sensitivity on grating type. The grating temperature coefficient is larger for gratings fabricated in hydrogen-free fibre than in hydrogenated fibre, with Type IIA gratings exhibiting the largest value overall, and Type IA gratings having the lowest value. The distinct sensitivity characteristics of these gratings, and in particular the Type IA and Type IIA gratings described above, have been utilized to implement a dual-parameter optical waveguide grating sensor for simultaneous measurement of temperature and strain, which exhibits performance superior to previously reported grating-based sensors for the same purpose.

Various modifications may be made without departing from the scope of the present invention. For example, a different type of optical waveguide may be used, which may comprise a different type of optical fibre or may alternatively comprise a planar optical waveguide. A different type of optical waveguide grating may be used in place of the Bragg gratings described. It will be appreciated by the skilled person that an alternative method of fabricating the optical waveguide gratings may be used, such as the known two-beam holographic interference grating fabrication technique. The skilled person will also understand that gratings having different resonant (Bragg) wavelengths may be used in place of those described, the wavelengths being at least in part being dependent upon the optical spectrum of the optical source.

Referring particularly to the described sensor, it will be appreciated that different interrogation means may be used in place of that described. More especially, the LED may be replaced by a different optical source, the OSA may be replaced by an alternative optical detection means, for example a photodetector and optical filter arrangement, and the fibre coupler may be replace by an optical circulator or other suitable optical signal routing means. The skilled person will understand that where the sensor comprises a plurality of sensing devices according to the present invention more than one coupler or circulator may be used to route the optical signals. Additionally, more than one interrogation means may be required to handle the wavelength multiplexed reflected optical signals.

Although the sensing device and the sensor described utilise a Type IA grating and a Type IIA grating, it will be appreciated that alternative combinations of Type I gratings (fabricated in hydrogen-free and hydrogen-loaded optical fibre), a Type IA grating and a Type IIA grating may be used instead.

What is claimed is:

1. An optical waveguide grating sensing device for a dual-parameter optical waveguide grating sensor, the sensing device comprising:
    a first optical waveguide grating of a first resonant wavelength provided in a first section of optical waveguide; and
    a second optical waveguide grating of a second resonant wavelength provided in a second section of optical waveguide,
    the first optical waveguide grating being one of a Type I grating fabricated in a hydrogenated optical waveguide, a Type I grating fabricated in a non-hydrogenated optical waveguide, a Type IA grating, and a Type IIA grating, and
    the second optical waveguide grating being a different one of a Type I grating fabricated in a hydrogenated optical waveguide, a Type I grating fabricated in a non-hydrogenated optical waveguide, a Type IA grating, and a Type IIA grating,
    wherein the first and second gratings have different coefficients of rate of change of wavelength as a function of temperature and have substantially a same coefficient of rate of change of wavelength as a function of strain.

2. A device according to claim 1, wherein the first and second sections of optical waveguide are first and second sections of optical fibre.

3. A device according to claim 1, wherein the first and second sections of optical waveguide are first and second sections of Boron-Germania co-doped optical fiber.

4. A device according to claim 1, wherein the first and second optical waveguide gratings are fibre gratings.

5. A device according to claim 1, wherein the first and second optical waveguide gratings are fibre Bragg gratings.

6. A dual-parameter optical waveguide grating sensor comprising:
    a plurality of optical waveguide grating sensing devices, each optical waveguide sensing device comprising:
    a first optical waveguide grating of a first resonant wavelength provided in a first section of optical waveguide; and
    a second optical waveguide grating of a second resonant wavelength provided in a second section of optical waveguide,
    the first optical waveguide grating being of a first grating type and the second optical waveguide grating being of a second grating type different from the first grating type,
    wherein the first and second gratings have different coefficients of rate of change of wavelength as a function of temperature and have substantially a same coefficient of rate of change of wavelength as a function of strain;
    each optical waveguide grating sensing device being located at a different sensing location such that each device is used substantially simultaneously to determine the temperature and the strain at the respective location, forming a quasi-distributed sensor;
    each grating within sensor having a different resonant wavelength and the resonant wavelengths of the gratings within spectrally adjacent sensing devices being selected such that, in operation, the spectral profiles of the gratings within a first sending device do not substantially overlap with the spectral profiles of the gratings within an adjacent sensing device;
    an interrogator operable to determine the resonant wavelengths of the gratings and to measure any changes therein;
    the first and second gratings in each optical wavelength grating sensing device being arranged such that, in operation, both gratings are exposed to a same temperature and strain;
    wherein a change in the temperature and strain experienced by the gratings causes a change in the resonant wavelengths of the gratings, and
    measurement of the induced wavelength changes, together with temperature and strain coefficients of the gratings, enabling a magnitude of the changes in the temperature and the strain to be determined simultaneously.

* * * * *